United States Patent [19]

Siegel

[11] Patent Number: 5,079,932

[45] Date of Patent: Jan. 14, 1992

[54] DIRECT SORPTION SELF-COOLING BEVERAGE CONTAINER

[76] Inventor: Israel Siegel, 2980 Point East Dr., #D-612, N. Miami Beach, Fla. 33160

[21] Appl. No.: 648,037

[22] Filed: Jan. 30, 1991

[51] Int. Cl.$^5$ ............................................. F25D 3/08
[52] U.S. Cl. ...................................... 62/293; 62/101; 62/480; 62/457.3
[58] Field of Search ............... 62/101, 480, 293, 457.1, 62/457.3, 457.4

[56] References Cited

U.S. PATENT DOCUMENTS 4,250.720  2/1981  Siegel ................................. 62/480
4,993,236  2/1991  Wilson ............................... 62/293

Primary Examiner—Albert J. Makay
Assistant Examiner—John Sollecito

[57] ABSTRACT

The invention describes a sorption self-cooling beverage device which cools its beverage instantaneously, and no heat conducting surfaces are required. A chamber containing a beverage is mixed with a consumable refrigerant such as water. The boiling point of the beverage-refrigerant mixture is lowered to freezing temperatures by an air vacuum. The vapor generated by the boiling beverage-refrigerant mixture is conducted to another chamber containing a desiccant, which removes the vapor. A barrier permeable to water vapor but not to desiccant particles is placed between the beverage-refrigerant and desiccant chambers to prevent a contamination of the beverage by the desiccant. A water absorber is placed in the desiccant chamber to prevent a contamination of the beverage with liquid which may have entered the desiccant chamber from the beverage chamber.

7 Claims, 1 Drawing Sheet

DIRECT SORPTION SELF-COOLING BEVERAGE CONTAINER

BACKGROUND AND OBJECTIVES

The invention relates to self cooling containers, and in particular to sorption self cooling containers. Previous inventions relating to sorption self cooling and self heating containers have been described by the present author in U.S. Pat. Nos. 4,250,720, 4,736,599, and 4,928,495, by Thomas et al in U.S. Pat. No. 4,759,191, and by Sabin et al in U.S. Pat. No. 4,901,535. Essentially, the self cooling containers consists of a chamber containing water, the boiling point of which has been lowered by an air vacuum in the chamber. The chamber communicates reversibly with another chamber containing a desiccant which removes the vapor generated by the low boiling point water. By closing the communication between the water-refrigerant and desiccant chambers the self cooling device can be stored indefinitely without losing its cooling potential. The cooling action is initiated by opening of the communication between the refrigerant and the desiccant chambers. In all of the above inventions the refrigerant and the beverage to be cooled are placed in separate containers. As the refrigerant boils it cools itself to its relatively low boiling point temperature. The refrigerant then cools the surfaces of its container. The cold surfaces of the container then cool the beverage which is placed outside of the refrigerant container. Thus, the cooling of the beverage is dependent upon heat transfer from the beverage to the refrigerant through the surfaces of the cold container. This requires the construction of relatively large heat conducting surfaces between the refrigerant and the beverage. This transfer of heat takes more time than the cooling of the refrigerant which occurs almost instantaneously during the boiling of the refrigerant. The main objective of the present invention is to obtain a direct and instantaneous cooling not only of the refrigerant but also of the beverage. This is achieved by adaptations which mix the beverage and the refrigerant in the same chamber, and allow a direct communication between the beverage-refrigerant mixture and the desiccant chamber. The refrigerant consists of water, the boiling point of which has been lowered by an air vaccum. The beverage used consists of any non-carbonated drink such as juice or ice tea as will be described.

Because of the direct communication between the beverage and the desiccant additional means are required to prevent a contamination of the beverage by the desiccant. This is achieved by a semi-permeable barrier between the chambers which prevents the passage of desiccant particles and allows the free passage of water vapor. In addition, a water absorber is placed in the desiccant chamber to prevent a contamination of the beverage by liquid which has entered or formed in the desiccant chamber. A more detailed description of the novel feature of the invention is given in the Detailed Description section.

SUMMARY

The invention consists of improvements in sorption coolers which allow a direct and instantaneous cooling of non-carbonated beverages. A chamber containing an air vacuum contains a beverage diluted with water. The vapor phase of the beverage-water mixture is in direct communication with a second chamber containing a desiccant. The air vacuum lowers the boiling point of the beverage-water mixture and causes the beverage to boil until its temperature is lowered to its boiling point. The desiccant removes the vapor generated by the boiling beverage-water mixture. Unlimited storage of the cooling potential is obtained by closing of the communication between the chambers. A semi-permeable barrier between the chambers prevents a contamination of the beverage by the desiccant, but allows the free movement of water vapor between the chambers. A water absorber in the desiccant chamber prevents a contamination of the beverage by moisture or liquid which have entered the desiccant chamber.

FIG. 1 is cross-sectional view of an embodiment of the invention.

DETAILED DESCRIPTION

Figure 1:
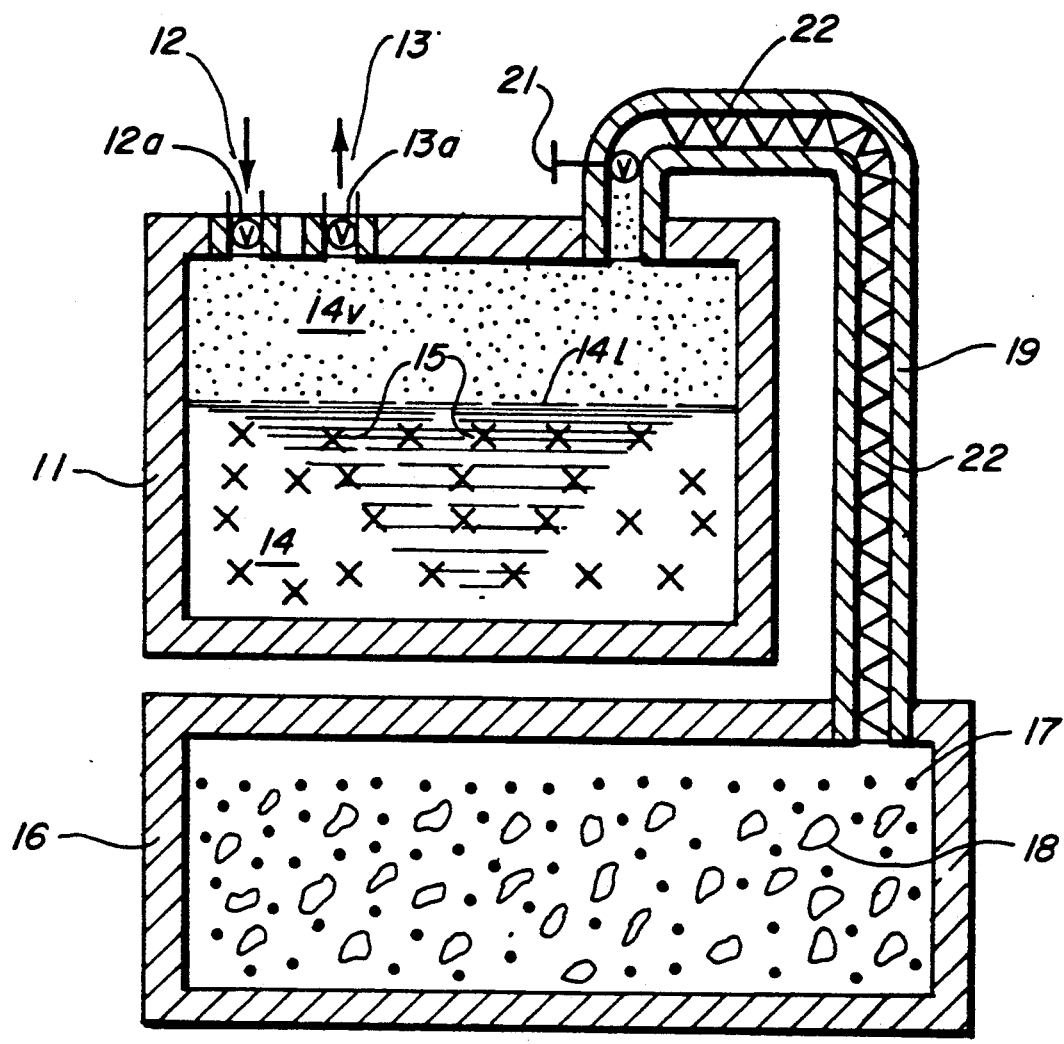

Referring to FIG. 1, there is shown a chamber 11. Present on the top wall of chamber 11 are inlet 12 and outlet 13. Valve 12a opens and closes inlet 12. Valve 13a opens and closes outlet 13. The arrangement is that valve 13a is opened and air is removed from the chamber through outlet 13. When a predetermined vacuum has been obtained valve 13a closes the outlet 13. Valve 12a is then opened and a beverage 14 and is introduced into chamber 11 though inlet 12. A refrigerant consisting of water 15 is then added into the chamber. The water 15 becomes incorporated into the natural water of the beverage to form a diluted beverage. The amount of water 15 introduced into chamber 11 should be equal to about 10% of the amount of beverage present in chamber 11. For example, 25 ml of water should be added to 250 ml of beverage. This is approximately equal to the amount of water which would evaporate from 250 ml of the the beverage during the cooling process. Water which dilutes the beverage is thus removed when the beverage is cooled. The water of the beverage evaporates to form a vapor phase 14v above the liquid phase 14l of the beverage-refrigerant mixture.

Present below chamber 11 is another chamber 16. Inside the chamber 16 there is a desiccant 17, such as non-toxic molecular sieve like Silico Aluminate Zeolite. The amount of desiccant required is approximately equal to the amount of the beverage in the beverage chamber 11. For example, 250 grams of desiccant would be required to cool a 250 ml beverage. The desiccant would sorb water vapor which is about 10% of the desiccants weight, which is equal to 25 grams of water vapor.

The desiccant chamber also contains a water absorber 18, such as an SGP absorbent polymer (General Mill Chemicals). The absorbent absorbs water which is about 500 times the absorber's weight. A minimum of 5-10 grams of the absorber is, therefore, required for a 250 ml beverage. A pipe 19 communicates between the vapor phase of 14v and chamber 16. A valve 20 opens and closes pipe 19. A manual valve handle 21 closes and opens valve 20. Present inside pipe 18 is a filter 22. The filter is designed to block the transfer of desiccant from the desiccant chamber to the beverage chamber, but to allow a free movement of vapor and air between the chambers.

The operation of the direct cooler is as follows. When a cooling action is not desired, the valve 20 closes pipe 19, and prevents a communication between chambers 11 and 16. The vacuum in chamber 11 causes the beverage-water mixture to boil until the vapor pressure in chamber 11 becomes equal to the vapor pressure of the boiling water. This stops the additional boiling of the water, and the cooler can be stored indefinitely at ambient temperature without losing its cooling potential.

When a cold drink is desired valve 20 is opened through handle 21. This opens the communication between chambers 11 and 16. This allows vapor 14v to leave chamber 11 and enter chamber 16. The vapor which enters chamber 16 is absorbed or adsorbed by desiccant 17. This reduces the vapor pressure in the chamber 16 to below that of chamber 11. This causes an additional transfer of vapor from chamber 11 to chamber 16. The vapor in chamber 11 is then replaced by additional boiling of water in chamber 11. The water present in beverage 14 boils continuously until desiccant 17 is saturated with water vapor, or until the temperature of the beverage drops to the boiling point of its water. When the temperature of the beverage drops it is ready for consumption. Filter 22 prevents a contamination of the beverage by the desiccant during the opening of valve 20. Water absorber 18 prevents the contamination of the beverage with moisture which has formed in, or has entered the desiccant chamber.

While the present embodiment of the invention use water as a consumable refrigerant, it is understood that other drinkable refrigerants, such as alcohol under a vacuum, may be used without departing from the essence of the invention.

What is claimed is:

1. A direct sorption self cooling beverage container consisting of a chamber,
   a mixture of a beverage and a refrigerant distinct from said beverage for boiling off in said chamber to obtain a direct cooling of said beverage,
   a partial vacuum in said beverage-refrigerant chamber to lower the boiling point of said beverage-refrigerant mixture,
   a second chamber,
   a desiccant in said second chamber,
   a communication between the beverage and the desiccant chambers, means to reversibly close said communication to obtain an unlimited storage of the cooling potential of said container.

2. The invention as described in claim 1 wherein said refrigerant is water.

3. A direct sorption self cooling beverage container consisting of a chamber,
   a beverage in said chamber,
   a partial vacuum in said beverage chamber to lower the boiling point of said beverage,
   a second chamber,
   a desiccant in said second chamber,
   a communication between said beverage and said desiccant chambers,
   means to reversibly close said communication to obtain an unlimited storage of the cooling potential of said container,
   and means to prevent a contamination of said beverage with said desiccant comprised of a filter located between said beverage and desiccant chambers.

4. The invention as described in claim 3 wherein said means to prevent a contamination of said beverage with said desiccant consists of a barrier which prevents the passage of desiccant particles but allows the passage of vapor.

5. A direct sorption self cooling beverage container consisting of a chamber,
   a beverage in said chamber,
   a partial vacuum in said beverage chamber to lower the boiling point of said beverage,
   a second chamber,
   a desiccant in said second chamber,
   a communication between the beverage and desiccant chambers,
   means to reversibly close said communication to obtain an unlimited storage of the cooling potential of said container,
   and means to immobilize liquid in said desiccant chamber comprised of a liquid absorbing material.

6. The invention as described in claim 5 wherein said means to immobilize said liquid in desiccant chamber consists of a water absorber.

7. A direct sorption self cooling beverage container consisting of a chamber,
   a mixture of a beverage and a refrigerant distinct from said beverage for boiling off in said chamber to obtain a direct cooling of said beverage.
   a partial vacuum in said beverage chamber to lower the boiling point of said beverage,
   a second chamber,
   a desiccant in said second chamber,
   a communication between the beverage and desiccant chambers,
   means to reversibly close said communication to obtain an unlimited storage of the cooling potential of said container,
   and extra water in said beverage to prevent a dehydration of said beverage.

* * * * *